Patented May 11, 1937

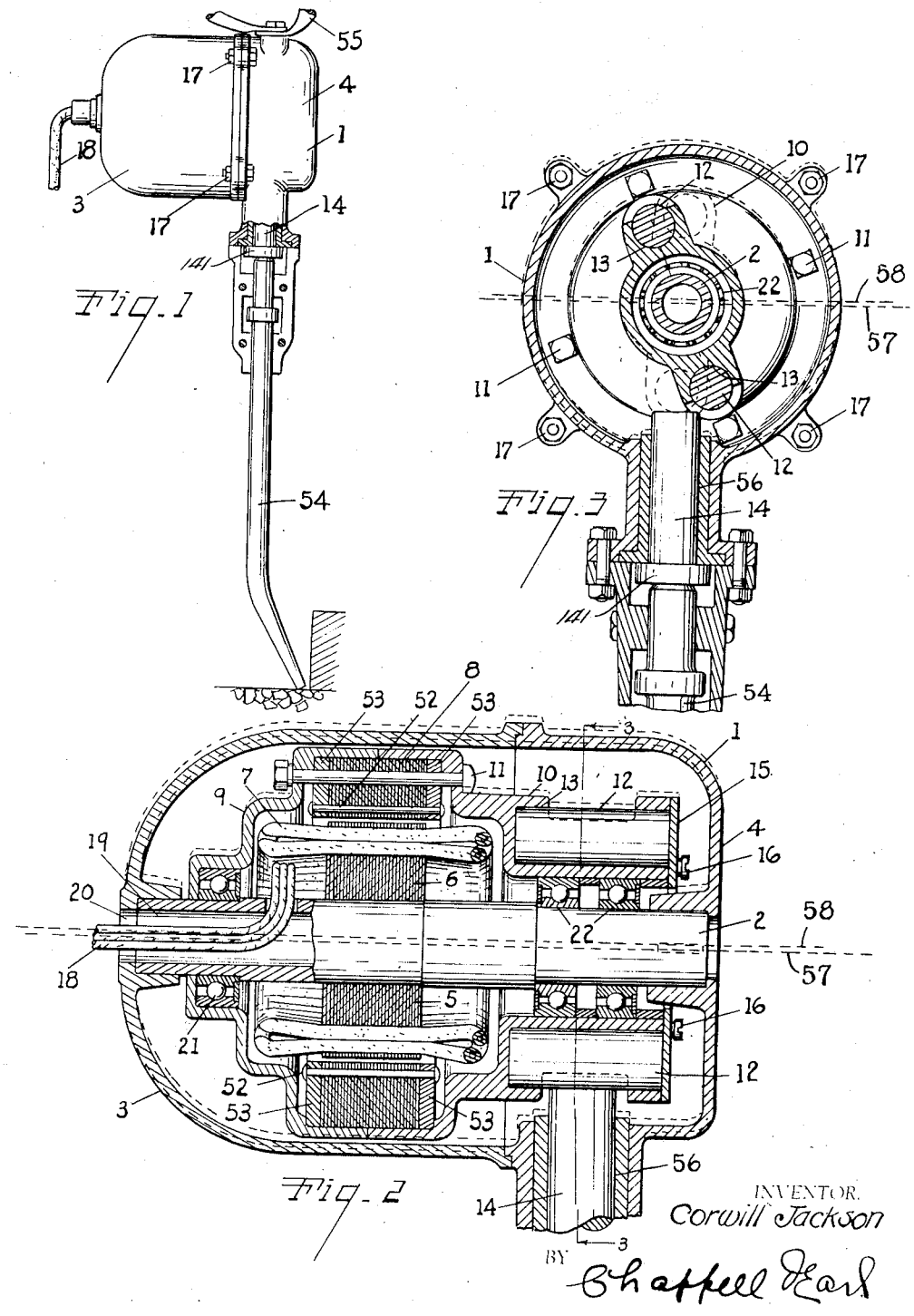

2,079,909

UNITED STATES PATENT OFFICE 2,079,909

VIBRATING MOTOR

Corwill Jackson, Ludington, Mich.

Original application September 26, 1934, Serial No. 745,563. Divided and this application February 9, 1935, Serial No. 5,741

3 Claims. (Cl. 125—33)

This application is a division of my application, Serial No. 745,563, filed September 26, 1934, for Vibrating motors Patent No. 2,025,287, issued December 24, 1935.

The main objects of this invention are:

First, to provide an improved electric motor which is especially well adapted for operating vibration apparatus such as tampers and devices for vibrating newly poured concrete internally.

Second, to provide a motor of the foregoing character, which is characterized by a high flywheel effect in proportion to its weight.

Third, to provide a squirrel cage induction motor of small diameter.

Objects relating to details and economies of my invention will appear from the description to follow. The invention is defined and pointed out in the claims.

A structure which is a preferred embodiment of my invention is illustrated in the accompanying drawing, in which:

Fig. 1 is a view mainly in side elevation of an electric tamper embodying the features of my invention.

Fig. 2 is an enlarged fragmentary longitudinal section.

Fig. 3 is a transverse vertical section taken on a line corresponding to line 3—3 of Fig. 2.

In squirrel cage induction motors of conventional design, it is customary to wind the field coils on forms, after which the coils are inserted in slots of the laminated stator and secured by strips of hardwood or fiber acting as supporting wedges. The rotor of the conventional squirrel cage type motor is arranged within the stator and consists of a laminated core having spaced holes around its periphery into which are driven copper conductor bars, the ends of which are usually welded to short-circuiting rings, thus forming a so-called squirrel cage rotor. My motor departs from such conventional design inasmuch as the windings are placed in suitable slots on a non-revolving inner core or stator while the rotor or squirrel cage revolves around the fixed stator.

To the ends of the revolving squirrel cage are secured end caps which serve as brackets for the ball bearings which are in turn supported at the ends of the stator upon a non-revolving shaft. An outer casing consisting of sections is secured to the ends of the shaft. With this arrangement, I obtain a maximum flywheel effect and thus reduce the dimensions and weight of the motor materially over that possible in the conventional design. Further, the bearings are arranged in their most effective position to transmit forces acting between the shaft and the operating mechanism of the device.

These advantages are particularly important in tools of the manually operated or portable type such as tie tampers or other impact tools, in which class of tools it is essential that a motor with maximum flywheel effect be used so as to provide sufficient momentum to actuate the striking cam or roller. In the past, in order to obtain this maximum flywheel effect, it was necessary in the conventional design to either install a flywheel member on the armature shaft or increase the armature to abnormal dimensions, each of which tends to so increase the weight of the machine that it is difficult for the operator to manually manipulate it. My improved motor solves this problem in providing a high flywheel effect in proportion to weight.

Referring to the drawing, 1 in general is a tie tamper embodying the features of my invention. This tamper is provided with a stationary or non-rotating shaft 2 supported at its ends by the outer casing sections 3 and 4. On the stationary shaft is mounted a stator 5 consisting of the laminations 6 and windings 7. The squirrel cage revolving element or rotor 8 is provided with end caps or members 9 and 10 which are securely clamped thereto by means of through bolts 11. Impact rollers 12 are carried in recesses 13 formed in the end member 10 as shown.

The tappet 14 is arranged to be interposed in the path of the impact rollers 9, the latter being held in position by the retaining plate 15 secured to the assembly by screws 16. The casing sections 3 and 4 enclose the assembly and are clamped together by means of the bolts 17. The windings 7 are connected to a 60-cycle 3-phase alternating current power source (not shown) by the conductors 18 which extend through the axial bore 19 and opening 20 in the stationary shaft 2 and casing 3 respectively.

The rotor is rotatably mounted on the stationary shaft by means of the bearings 21 and 22, the latter being arranged in the spaces between the ends of the stator and the ends of the casing sections 3 and 4. The spaced bearings 22 are disposed in a transverse plane between the impact rollers 12 and the shaft 2 in such manner that the forces transmitted are balanced. Further, the arrangement of the rotor in my construction is such that I obtain the ultimate in flywheel effect and am thereby enabled to reduce the dimensions and weight of the motor materially over that possible where the conventional design is employed.

The conductor bars 52 are arranged through suitable openings in the laminations of the rotor and are connected at their ends to the end rings 53 disposed between the laminations and the end caps 9 and 10 as shown, the end rings being of the same shape but thicker than the stator laminations. A very compact external rotor is thus provided having a maximum flywheel effect considering the small size of the motor and its low rating and light weight.

The tamper tool 54 is operatively associated with the tappet 14 so that the machine causes the tool to deliver a rapid series of weighted hammer-like blows in operation, the machine being moved from place to place by means of a handle 55. A very powerful, light and efficient hammer blow tie tamper is the result.

The casing has a vertical tappet way 56 in the bottom thereof for the tappet 14 which is adapted to engage the tamper tool 54 to support the casing and contents thereof. Tappet 14 is provided with an annular shoulder 141 at the bottom thereof, which is adapted to rest on tamper tool 54. The shoulder provides specific means for normally supporting the casing and contents thereof as well as the elements associated therewith in slidable relation to tool 54. Thus, in operation, the engagement of each impact roller 12 with the tappet 14 tends to elevate the casing and its contents relative to the tappet, as shown in dotted lines in Figs. 2 and 3, resulting in the delivery of a series of weighted thrusts to the tamping tool. The force of the thrusts is transmitted through the impact rollers 12 and bearings 22 to the stationary shaft 2, the bearings being positioned under the impact rollers and in line with the tappet.

Fig. 3 illustrates the relation of the impact roller and tappet in the operation of the device. The solid lines show the relation of the parts at the moment of impact, in which case the center line of the revolving element is at 57. When the impact roller fully engages the tappet and the end member 10 is in the position illustrated by the dotted lines, the center line of the revolving element tends to be moved to 58. In this position, the entire weight of the motor and casing is lifted from the center line 57 to the center line 58. Thus, the engagement of each impact member with the tappet carries with it the entire weight of the casing and its contents. The result is the delivery of a series of thrusts to the tamper tool, each thrust being backed up by the weight of the device.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except in so far as is necessitated by the prior art and by the spirit of the appended claims.

Having thus described my invention, what I claim as new and desire to secure by Letters Patent is:

1. In a device of the character set forth, the combination with a casing, and a central shaft fixed at its ends to the ends of said casing, of a laminated stator keyed to said shaft medially of its ends and having winding coils, a laminated rotor adapted to rotate between said casing and stator and having end conductor rings and longitudinal conductor bars, end members on said rotor having internal bearing recesses surrounding said shaft, and bearings disposed on the shaft within said recesses, one of said end members being conformed to provide a carrier around its bearing, and impact members mounted on said carrier.

2. In a device of the character set forth, the combination with a casing, and a central shaft fixed at its ends to the ends of said casing, of a stator keyed to said shaft medially of its ends and having winding coils, a rotor adapted to rotate between said casing and stator, end members on said rotor having internal bearing recesses surrounding said shaft, and bearings disposed on the shaft within said recesses, one of said end members being conformed to provide a carrier around its bearing, and impact members mounted on said carrier.

3. The combination of a casing having a vertical tappet way in the bottom thereof, a tappet in said way adapted to engage a tamper tool, a central horizontal shaft fixed at its ends to the end walls of said casing, an electric motor stator mounted on said shaft medially of its ends, a rotor housing said stator, there being bearings between the ends of said rotor and said shaft, and impact rollers carried by said rotor at one end thereof for coaction with said tappet, the engagement of each roller with said tappet tending to elevate the casing and its contents relative to the tappet, resulting in the delivery of a series of weighted thrusts to the tamping tool, the bearings at one end of said rotor being positioned under said impact rollers and in line with said tappet.

CORWILL JACKSON.